C. B. PHILLIPS.
CREAM SEPARATOR.
APPLICATION FILED NOV. 10, 1906. RENEWED JAN. 5, 1910.
952,686.
Patented Mar. 22, 1910.
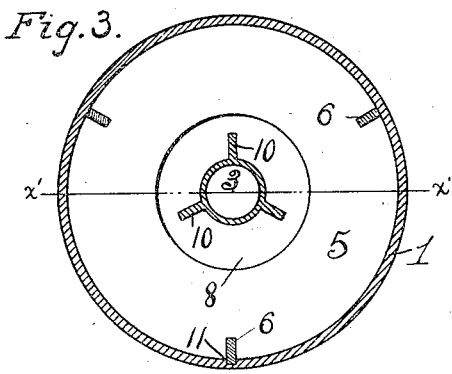
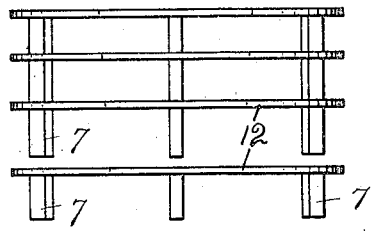
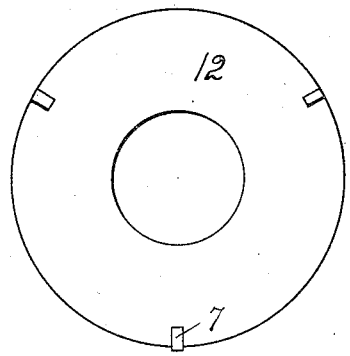
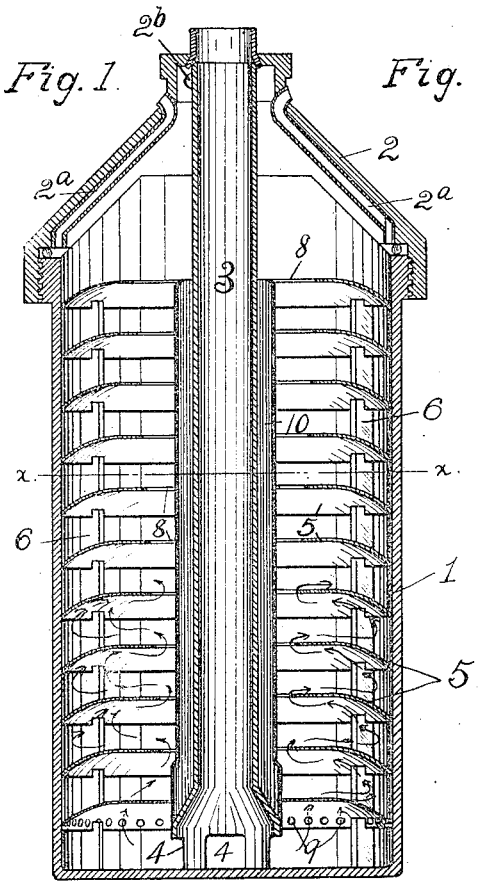
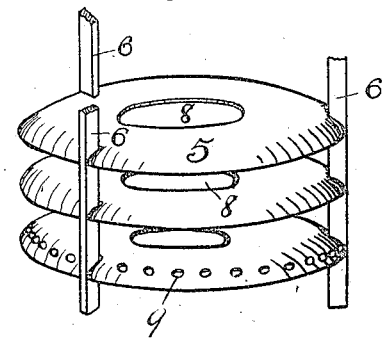
Witnesses.
Hazel B. Hiett
Stephen N. Oldham
Inventor.
Charles B. Phillips,
By Owen & Owen,
His attorneys.

UNITED STATES PATENT OFFICE.

CHARLES B. PHILLIPS, OF BLISSFIELD, MICHIGAN.

CREAM-SEPARATOR.

952,686.　　　　Specification of Letters Patent.　　Patented Mar. 22, 1910.

Application filed November 10, 1906, Serial No. 342,772. Renewed January 5, 1910. Serial No. 536,483.

*To all whom it may concern:*

Be it known that I, CHARLES B. PHILLIPS, a citizen of the United States, and a resident of Blissfield, in the county of Lenawee and State of Michigan, have invented certain new and useful Improvements in Cream-Separators; and I do hereby declare the following to be a full, clear, and exact description of the invention, such as will enable others skilled in the art to which it appertains to make and use the same, reference being had to the accompanying drawing, and to the figures of reference marked thereon, which form a part of this specification.

My invention relates to apparatus for separating cream from milk, and it has for its object to improve upon the construction of apparatus of this class, and particularly the construction covered by my former United States Letters Patent No. 708,730, granted September 9, 1902, whereby a more perfect and efficient separation of the cream from the milk is effected and the practicability and commercial value of the separator materially enhanced.

The operation, construction and arrangement of the parts of the invention are fully described in the following specification and illustrated in the accompanying drawing, in which,—

Figure 1 is a central vertical section of a creamer embodying my invention. Fig. 2 is a perspective view of a portion of the concaved shelves or disks shown in Fig. 1. Fig. 3 is a cross-section on the dotted line *x x* in Fig. 1, and Figs. 4, 5, and 6 are different views of modified forms of the disks.

Referring to the drawings, 1 designates the revoluble cylindrical bowl or shell forming the separator chamber of a creamer, 2 the removable top thereof, which is of conical shape and has the usual outlets for the milk, as at 2ª, and for the cream, as at 2ᵇ, and 3 the axial feed-pipe or tubular shaft through which the milk is supplied to the separating-chamber and which communicates with said chamber through lateral openings 4 in its lower end.

Surrounding the feed-pipe 3 within the bowl 1 are arranged a plurality of superimposed disk-like members or shelves 5, which are removable therefrom for the purpose of cleaning and either rigidly spaced apart by vertical ribs or strips 6 or supported in suitable spaced relation above each other by the legs 7, as shown in Fig. 4, thus enabling them to be separated from each other. These disks are preferably concaved with their convexed surfaces uppermost, and are spaced so that the lower edge of each is disposed a short distance above the upper surface of the disk next below, substantially as shown. Each disk has its outer edge or periphery flush with the casing 1 so the milk cannot pass therearound, and all are provided with openings 8 concentric to the feed-pipe or shaft 3. The size of each opening 8 is slightly increased over that of the opening in the disk next below, so that the milk as it passes upwardly through the outer portion of each opening is permitted to escape the cream zone which gradually increases in thickness from bottom to top of the separator-chamber. This feature is very essential to the proper operation of the creamer as it is important that the milk in its upward movement shall not have an agitating contact with the stratum of cream surrounding the feed-pipe or shaft 3, as the particles of cream must not be broken or subjected to any concussion.

The lower disk 5 of the set is provided adjacent its outer edge with a plurality of small openings or apertures 9 through which the milk is caused to pass in its ascent after being discharged to the separator-chamber from the lower end of the feed-pipe or tubular shaft 3.

The feed-pipe or shaft 3 is provided longitudinally thereof with a plurality of radiating wings or flanges 10, which turn with the shaft and casing and combine with the ribs or strips 6 to impart a whirling centrifugal movement to the milk. In order to prevent the disks 5 turning relative to the shell they may be locked thereto by one of the ribs or strips 6 being radially broadened to form a key which coacts with a groove in the casing, as shown at 11 in Fig. 3, or they may be secured against relative movement in any other suitable or convenient manner.

In the operation of my improved creamer the shell or separator-chamber is revolved in any suitable manner, and the milk to be acted on fed thereto through the feed-pipe or tubular shaft 3, which revolved with the shell. The milk as it is discharged from the lower end of the shaft is forced through the openings 9 in the lower disk 5 into the compartment next above, thence through the central opening 8 therein, but outside of the cream stratum, which, due to its lower specific gravity, now begins to separate from the revolving milk and hug the wall of the feed-pipe 3, and so on through each superimposed compartment and disk opening until the top of the chamber is reached, where the separated milk and cream are conducted away through different channels. As the milk enters each compartment formed by the several disks it is caused by the centrifugal force acting thereon to move to the outer portion of the compartment, while the impelling force behind causes it to strike the concaved surface of the disk next above and approach the center of the compartment in order to find an exit therefrom through the opening 8 in such disk, thus causing the milk to follow a zig-zag course, as indicated by the arrows in Fig. 1, whereby to thoroughly extract the cream particles therefrom. It is found by the arrangement of the disks, as shown, that the repeated backward and forward action of the milk causes a more perfect separation of the cream than is possible with other types of hand creamers and that the gradually increasing cream stratum is not broken or subjected to any injurious concussion by the contact of the milk therewith.

While I have described the disks 5 as being concaved in form, I do not wish to limit myself to this form, as a plurality of flat disks 12, as shown in Figs. 4, 5 and 6, may be employed if desired. It is preferable, however, to use the concaved form of disks, as the eddies which would be formed at the sharp angles at the outer lower edges of the flat disks are avoided with the concaved construction of disk.

Having thus described my invention, what I claim as new, and desire to secure by Letters Patent, is,—

In a creamer, a revoluble bowl, a plurality of spaced superimposed disks having their peripheries flush with the bowl sides and curved downwardly to prevent eddies at such points, each disk having a central opening of greater diameter than that of the disk next below whereby the cream zone is gradually enlarged from bottom to top thereof, and a feed-pipe disposed axially within the bowl and extending through the disk openings with its discharge at the bottom of the bowl.

In testimony whereof I have hereunto signed my name to this specification in the presence of two subscribing witnesses.

CHARLES B. PHILLIPS.

Witnesses:
C. W. OWEN,
HAZEL B. HIETT.